United States Patent Office 3,382,906
Patented May 14, 1968

3,382,906
TIRE CHAIN FOR VEHICLE TIRES
Anton Müller, Unterkochen, and Hubert König and Alfred Kraus, Aalen, Germany, assignors to Eisen- und Drahtwerk Erlau A.G., Aalen, Germany
Filed Aug. 12, 1965, Ser. No. 479,180
Claims priority, application Germany, Aug. 14, 1964, E 27,607
4 Claims. (Cl. 152—243)

The present invention relates to a chain and, more specifically, to a tire protective or skid preventing chain. Chains of this type, which are best known as snow chains, comprise a tread section to be placed over the tread area of the tire, and two side sections, while the tread section is composed of individual net-like interengaging chain links.

Heretofore known chains of the type involved have the drawback that after the tread section has worn or is broken, the side sections can no longer be employed inasmuch as they are non-detachably connected to the tread section so that the entire chain will have to be discarded. On the other hand, however, the tread section is subjected to a considerably greater wear than the side sections so that as a rule, the side sections are still in very good shape at the time the tread section has worn or is broken.

With skid preventing or tire protective chains which in contrast to other similar chains are provided with a chain net on the tread section, the arrangement of the chain or the formation of the individual interconnecting chain links is such that the links are within the tread net, due to the joint-like connection, movable to a limited extent in and transverse to the circumferential direction of the tire. Consequently, the tread net is able to adapt itself to varying ground contours as, for instance, to a stony surface. Other tire protective or skid preventing chains, instead of being provided with a tread net, having a tread section which is composed of individual rigid groups, while the groups are arranged one after another in circumferential direction of the vehicle tire and always one group has approximately the width of the tire tread surface in the manner of the members of a track-laying chain. The individual groups which consist, for instance, of oblong braced supports, have rollers and vertical grippers adapted to dig into the ground but are unable, due to their rigidity, to adapt themselves fully to the ground contour. Such tire protective or skid preventing chains are, therefore, not useful for street vehicles but only for movable earth-working machines, tractors and the like vehicles moving on muddy or rocky soil. The individual groups of the tread section of such tire protective and skid preventing chains are connected to the side sections of the chains by screws and the like. To this end, the oblong supports of the tread section are provided with rings which are suspended in a correspondingly screwed ear. The drawback of such a design is seen in the fact that the screw connection will, after a certain period of use of the chain, become rust-stuck and will be plastically deformed so that it can no longer be loosened. Furthermore, for purposes of disassembling such damaged tread section group of the tire protective chain, it is necessary to disassemble or remove the entire chain from the vehicle tire.

It is, therefore, an object of the present invention to provide a tire protective and skid preventing chain for vehicle tires which will overcome the above-mentioned drawbacks.

It is another object of this invention to provide a chain of the above-mentioned general type, which has a tread section and two side sections, which will make it possible, in case of damage or breakage of the tread section, easily to exchange the damaged portion on the spot.

It is a still further object of this invention to provide a chain of the type set forth above, in which the tread section will be highly wear-resistant.

These and other objects and advantages of the invention will appear more clearly from the following specification in conection with the accompanying drawings, in which:

FIGURE 1 diagrammatically illustrates a portion of a tire protective chain according to the invention;

With a tire protective chain for motor vehicle tires, which comprises a tread section and two side sections while the tread section is composed of net-like interengaged link chains, the tread net which rests on the tire tread is, in conformity with the present invention, disengageably connected to the side sections and may be reinforced with regard to or be made stronger than the side sections. In view of this arrangement, it is possible, with a tire chain having a tread net section, to separate the tread net in a simple manner from the side sections and to replace said tread net section by a new tread net section. The reinforced design of the tread section with regard to the side section assures a relatively long life of the tread net.

According to another feature of the present invention, the exchangeable tread net may be provided with hooks, for instance single and double hooks, heart-shaped members, and the like by means of which said tread section is connected to the side sections. This connection by hook members permits the assembly of the tread net without any special tools so that the tread net can be exchanged at any desired location. In this connection, it is particularly advantageous to make the tread net of web and ring members and to design the connecting webs engaging the rings of the side sections as single or double hooks.

According to still another feature of the present invention, the reinforcement of the tread net with regard to the side sections may be obtained by making the web members of the tread net stronger and more wear-resistant than the members of the side sections. The web members which are approximately perpendicular to the tire surface and which protrude further beyond this tread surface than the ring members will, with relatively plane bottom cover, form the running surface of the tire chain. For making the tread net stronger, it is also possible to provide two or more parallel web members adjacent to each other and to link the same to ring members common thereto.

In order to be able to exchange individual portions of the tread net which are, for instance, damaged or worn, it is advantageous to design the webs of the tread net in the form of exchangeable web members, preferably in the form of double hook members. In this way, tire chains according to the present invention are still less expensive in use because the tread net itself consists of detachable interconnected elements which can easily be exchanged in case of damage or wear.

Figure 1:
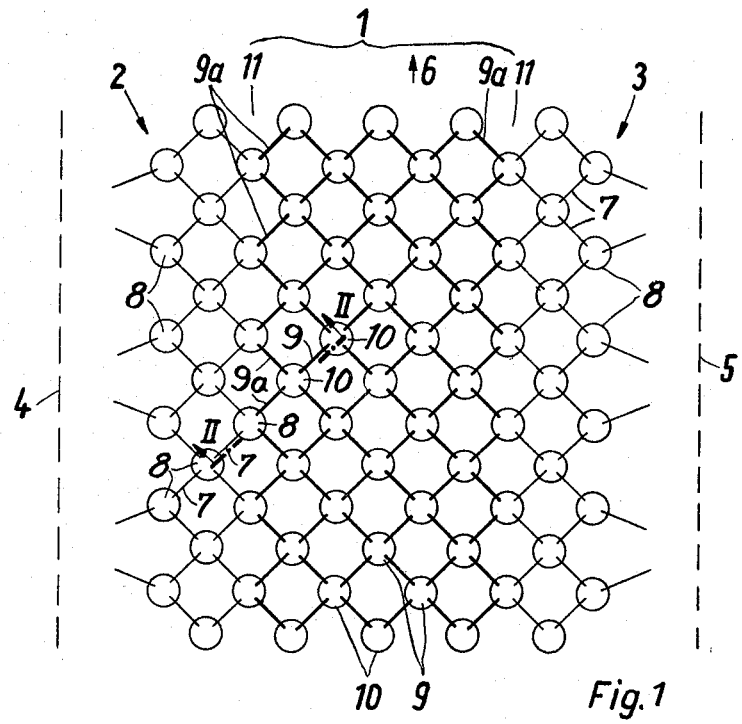

Referring now to the drawings in detail, the tire chain, a part of which is shown in FIG. 1, is composed of a tread section 1 in the form of a net extending in the direction of the arrow 6 over the tread area of a tire, i.e. in circumferential direction of the tire, and also comprises two side sections 2, 3 respectively connected to opposite sides of the tread section 1. Each of the side sections 2, 3 which are likewise net-shaped, is provided with a side chain 4 and 5 respectively connected to individual links 7, 8 of the side sections 3, 2.

As will furthermore be seen from the drawing, the tread section 1 is composed of web members 9a and ring members 10 which pivotally interengage each other in the manner of links of link chains and are thus movable within certain limits in and transverse to the circumferential direction of the tire indicated by the arrow 6. With the particular embodiment illustrated in FIG. 1, also the side sections 2, 3 of the tire chain are designed as nets which, with the installed tire chain are located on the side walls of the vehicle tire.

The tread section 1 of the tire chain according to the present invention is detachably connected to the side sections 2, 3. To this end, those web members which are located within the merging area 11 of the tread section with the side section are designed as hook members 9a. Each of those ring members 10 of the tread section 1 which are located in the above-mentioned merging area 11, has two web members 9a in the form of hooks suspended therein which, in their turn, are respectively connected to two ring members 10 of the respective adjacent side sections 2, 3 whereby the respective side sections are detachably connected to the tread section.

Figure 2:
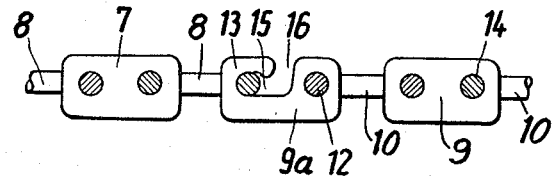
FIGURE 2 represents a section along the line II—II of FIGURE 1.

According to the embodiment illustrated in FIG. 2, the hook member 9a is designed as a single hook member having a corresponding bearing opening 12 by means of which it is pivotally journalled on a ring member 10 of tread section 1. That hook portion of hook 9b which is opposite the bearing opening 12 is hooked into a corresponding ring member 8 of the side section 2. However, if desired, the hook member 9a of FIG. 2 may also be replaced by a double hook member 9b, as shown in FIG. 3, which has two oppositely located hook sections 13.

Figure 3:
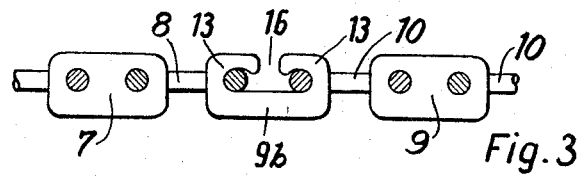
FIGURE 3 illustrates a section similar to that of FIGURE 2 of a slight modification of the disengageable chain link.

As will furthermore be seen from FIGS. 2 and 3, the hook-shaped members 9a, 9b are designed similar to the web members 9 of tread section 1, the only difference being that instead of the bearing recesses 14 in web members 9, there is provided at least one open hook-shaped end 15 with an opening 16 for introducing the respective ring member 8. The hook members 9a, 9b are, similar to the web members 9 of tread section 1, preferably designed somewhat stronger than the web members of the side sections 2 and 3.

Figure 3A:
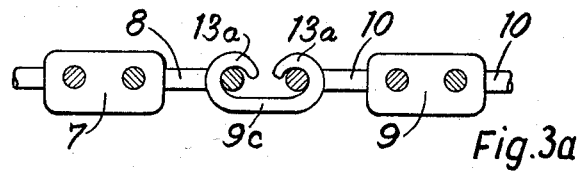
FIG. 3a is a cutout of a tire protective chain similar to that of FIG. 2, but somewhat modified thereover.

FIG. 3a represents a section of a tire protective chain similar to the section of FIG. 2, but modified thereover in that the web member 9c is formed by a double hook, the hook sections 13a of which are curved somewhat circularly.

Figure 4:
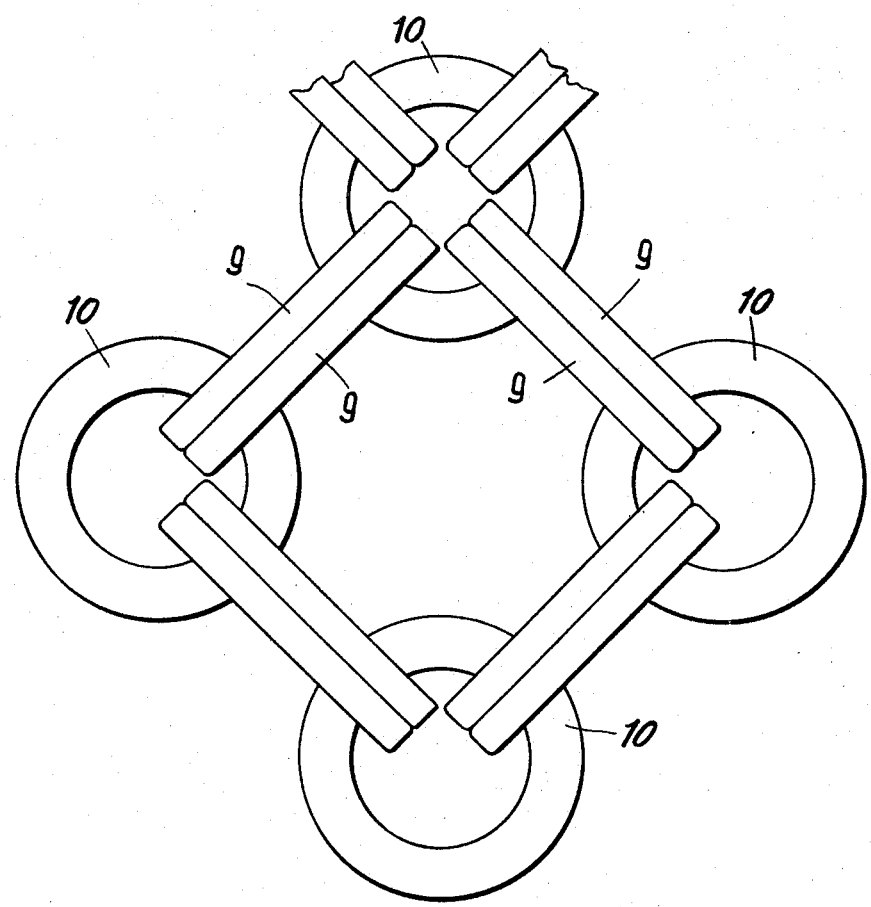
FIGURE 4 is a diagrammatic representation of a further embodiment of a tread section but on a considerably larger scale than that of FIGURE 1.

In order to strengthen or reinforce the web members 9 in the tread net section, it is also possible to arrange two or more web members 9 parallel to each other, as shown in FIG. 4, in which instance the respective two adjacent web members 9 are hooked in or linked to the same ring members 10.

It is, of course, to be understood, that the present invention is, by no means, limited to the particular constructions shown in the drawings, but also comprises any modifications within the scope of the appended claims.

What we claim is:

1. A tire chain for vehicle tires, which includes: an annular tread section to be placed over the tread area of a tire and having side edges, said tread section comprising a plurality of link means pivotally engaging each other to form an open mesh net-like member, and two side sections to be placed over the side walls of a tire and likewise comprising link means pivotally interengaging each other to form an open mesh flexible net-like member and each having an edge adjacent one of the said side edges of said tread section, hook-shaped longitudinal members distributed along and pivoted to one of each of the side edges of said tread portion and the adjacent edge of the said side member and adapted selectively to be engaged with and disengaged from the other of each adjacent pair of said edges, said hooked shaped members being formed by single hooks.

2. A tire chain according to claim 1, in which also the side sections comprise net-like interengaging ring members and web members, and in which at least the greater number of the web members of said tread section are stronger than the web mmebers of said side sections.

3. A tire chain for vehicle tires, which includes: a tread section to be placed over the tread area of a tire, said tread section comprising a plurality of ring means in distributed relation and web means moveably interconnecting adjacent ones of said ring means, said ring means and web means engaging each other in a net-like manner, and two side sections to be placed over the side walls of a tire and likewise comprising ring means in distributed relation and web means moveably interconnecting adjacent ones thereof so the ring means and web means of said side sections also interengage each other in a net-like manner, said tread section of said chain having the ring means along its marginal portions adjacent said side sections provided with double hook link means with the free ends of the hooks facing each other and spaced from each other so as to form a slot of approximately the width of the thickness of the ring means to be hooked into said double hook links, said double hook link means being adapted to be hooked into ring means along the edges of both said tread section and the side sections for detachably interconnecting said sections.

4. A tire chain according to claim 3 in which said link means comprise ring members in spaced relation and web members connecting adjacent ones of said ring members and at least some of the said web members of said tread section are arranged in pairs alongside each other and interengaging adjacent ring members.

References Cited

UNITED STATES PATENTS

| | | | |
|---|---|---|---|
| 883,572 | 3/1908 | Savage | 152—171 |
| 968,416 | 8/1910 | Reagan | 152—243 X |
| 1,299,225 | 4/1919 | Purvis | 152—171 |
| 1,875,268 | 8/1932 | Senglar | 152—243 |

FOREIGN PATENTS 443,511   7/1912   France.

ARTHUR L. LA POINT, *Primary Examiner.*

C. B. LYON, C. W. HAEFELE, Y. P. SCHAEVITZ,
*Assistant Examiners.*